(12) United States Patent
Brandin et al.

(10) Patent No.: US 6,493,813 B1
(45) Date of Patent: Dec. 10, 2002

(54) METHOD FOR FORMING A HASHING CODE

(75) Inventors: Christopher Lockton Brandin, Colorado Springs, CO (US); Harry George Direen, Colorado Springs, CO (US)

(73) Assignee: NeoCore, Inc., Colorado Springs, CO (US)

( * ) Notice: Subject to any disclaimer, the term of this patent is extended or adjusted under 35 U.S.C. 154(b) by 97 days.

(21) Appl. No.: 09/672,754

(22) Filed: Sep. 28, 2000

Related U.S. Application Data

(63) Continuation-in-part of application No. 09/419,217, filed on Nov. 22, 1999, now Pat. No. 6,324,636.
(60) Provisional application No. 60/159,722, filed on Oct. 15, 1999.

(51) Int. Cl.[7] ............................................... G06F 12/02
(52) U.S. Cl. ...................... 711/216; 711/210; 711/108
(58) Field of Search ................................. 711/216, 108, 711/210; 707/2, 3, 4, 6; 370/393; 365/49

(56) References Cited

U.S. PATENT DOCUMENTS

| | | | | |
|---|---|---|---|---|
| 4,215,402 A | * | 7/1980 | Mitchell et al. ............ 711/216 |
| 5,701,418 A | * | 12/1997 | Luitje ......................... 709/245 |
| 6,047,283 A | * | 4/2000 | Braun ............................ 707/3 |
| 6,097,725 A | * | 8/2000 | Glaise et al. ................ 370/395 |
| 6,292,795 B1 | * | 9/2001 | Peters et al. ................... 707/3 |

OTHER PUBLICATIONS

Ramakrishna, "A Simple Perfect Hashing Method for Static Sets", IEEE, 1992.*
Schneider, G. Michael, "Concepts in Data Structures and Software Development", West Publishing Co., 1991.*

* cited by examiner

Primary Examiner—Gary J Portka
(74) Attorney, Agent, or Firm—Dale B. Halling

(57) ABSTRACT

A method of forming a hashing code includes the steps of: first selecting a first linear feedback transform generator that is perfect over a first range. A maximum key length is determined next. When the maximum key length is greater than the first range for a transform, it is determined if a no collisions allowed condition exists. When the no collisions allowed condition exists, it is determined if the maximum key length is less than double the first range. When the maximum key length is less than double the first range, a first transform for a first part of a key is determined. A second transform for the key is then calculated. Next, a first-second combined transform is formed by concatenating the first transform and the second transform, wherein a first portion of the first-second combined transform is an address and a second portion of the first-second combined transform is a confirmer.

19 Claims, 21 Drawing Sheets

50

Store

| Add 66 | Confirmer 52 | FP 56 | Primary Flag 60 | Allocated Flag 62 | Association 64 |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 5 | 0 | 0 | |
| 5 | 4 | 6 | 0 | 0 | |
| 6 | 5 | 7 | 0 | 0 | |
| 7 | 6 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 2

50
Store

| Add (66) | Confirmer (52) | FP (56) | Primary Flag (60) | Allocated Flag (62) | Association (64) |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 6 | 0 | 0 | |
| 5 | C1 | 5 | 1 | 1 | A1 |
| 6 | 4 | 7 | 0 | 0 | |
| 7 | 6 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 3

50
Store

| Add⁶⁶ | Confirmer⁵² | FP⁵⁶ | Primary Flag⁶⁰ | Allocated Flag⁶² | Association⁶⁴ |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 7 | 0 | 0 | |
| 5 | C1 | 6 | 1 | 1 | A1 |
| 6 | C2 | 5 | 0 | 1 | A2 |
| 7 | 4 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 4

50
Store

| Add /66 | Confirmer /52 | FP /56 | Primary Flag /60 | Allocated Flag /62 | Association /64 |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 8 | 0 | 0 | |
| 5 | C1 | 7 | 1 | 1 | A1 |
| 6 | C3 | 6 | 1 | 1 | A3 |
| 7 | C2 | 5 | 0 | 1 | A2 |
| 8 | 4 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

FIG. 5

50
Store

| Add /66 | Confirmer /52 | FP /56 | Primary Flag /60 | Allocated Flag /62 | Association /64 |
|---|---|---|---|---|---|
| 0 | 15 | 1 | | | |
| 1 | 0 | 2 | | | |
| 2 | 1 | 3 | | | |
| 3 | 2 | 4 | | | |
| 4 | 3 | 6 | | | |
| 5 | C1 | 7 | 1 | 1 | A1 |
| 6 | 4 | 8 | 0 | 0 | 0 |
| 7 | C2 | 5 | 0 | 1 | A2 |
| 8 | 6 | 9 | | | |
| 9 | 8 | 10 | | | |
| 10 | 9 | 11 | | | |
| 11 | 10 | 12 | | | |
| 12 | 11 | 13 | | | |
| 13 | 12 | 14 | | | |
| 14 | 13 | 15 | | | |
| 15 | 14 | 0 | | | |

FIG. 6

50
Store

| Add /66 | Confirmer /52 | FP /56 | Primary Flag /60 | Allocated Flag /62 | Association /64 |
|---|---|---|---|---|---|
| 0 | 15 | 1 | | | |
| 1 | 0 | 2 | | | |
| 2 | 1 | 3 | | | |
| 3 | 2 | 4 | | | |
| 4 | 3 | 7 | | | |
| 5 | C1 | 5 | 1 | 1 | A1 |
| 6 | C3 | 6 | 1 | 1 | A3 |
| 7 | 4 | 8 | 0 | 0 | 0 |
| 8 | 7 | 9 | | | |
| 9 | 8 | 10 | | | |
| 10 | 9 | 11 | | | |
| 11 | 10 | 12 | | | |
| 12 | 11 | 13 | | | |
| 13 | 12 | 14 | | | |
| 14 | 13 | 15 | | | |
| 15 | 14 | 0 | | | |

FIG. 7

50
Store

| Add /66 | Confirmer /52 | FP /56 | Primary Flag /60 | Allocated Flag /62 | Association /64 |
|---|---|---|---|---|---|
| 0 | 15 | 1 | 0 | 0 | |
| 1 | 0 | 2 | 0 | 0 | |
| 2 | 1 | 3 | 0 | 0 | |
| 3 | 2 | 4 | 0 | 0 | |
| 4 | 3 | 7 | 0 | 0 | |
| 5 | C2 | 5 | 1 | 1 | A2 |
| 6 | C3 | 6 | 1 | 1 | A3 |
| 7 | 4 | 8 | 0 | 0 | |
| 8 | 7 | 9 | 0 | 0 | |
| 9 | 8 | 10 | 0 | 0 | |
| 10 | 9 | 11 | 0 | 0 | |
| 11 | 10 | 12 | 0 | 0 | |
| 12 | 11 | 13 | 0 | 0 | |
| 13 | 12 | 14 | 0 | 0 | |
| 14 | 13 | 15 | 0 | 0 | |
| 15 | 14 | 0 | 0 | 0 | |

$g(x) = x^3 + x + 1$ show $a(x) \, x^3 \bmod g(x)$     for different $a(x)$ $a(x) = 0$    $a(x) \, x^3 = 0$ 0    $a(x) \, (x^3) \bmod g(x) =$ $a(x) = 1$    $a(x) \, x^3 = x^3$

CRC

000

011

```
        1
1011) 1000      a(x) x³ mod g(x)
      1011      = x+1
        11
```

/302

| | Data | Transform CRC |
|---|---|---|
| 0 | 0000 | 000 |
| 1 | 0001 | 011 /304 |
| 2 | 0010 | 110 |
| 3 | 0011 | 101 |
| 5 | 0101 | 100 |
| 4 | 0100 | 111 |
| 7 | 0111 | 010 |
| 6 | 0110 | 001 |
| 11 | 1011 | 000 |
| 10 | 1010 | 011 |
| 9 | 1001 | 110 |
| 8 | 1000 | 101 |
| 14 | 1110 | 100 |
| 15 | 1111 | 111 |
| 12 | 1100 | 010 |
| 13 | 1101 | 001 |

FIG. 11

METHOD FOR FORMING A HASHING CODE

RELATED APPLICATIONS

The present application is a continuation-in-part of the patent application entitled "Memory Management System and Method", Ser. No. 09/419,217, filed on Nov. 22, 1999, now U.S. Pat. No. 6,324,636, issued Nov. 27, 2001 and assigned to the same assignee as the present application and claims benefit of provisional application 60/159,722 filed Oct. 15, 1999.

FIELD OF THE INVENTION

The present invention relates generally to the field of computer memory systems and more particularly to a method of forming a hashing code.

BACKGROUND OF THE INVENTION

Most computer memory today uses Random Access Memory (RAM) to store information. Each element of data has its own address. The Central Processing Unit (CPU) provides a singular address and can either read or write data at that location. This architecture is sequential in nature, requiring several processing steps to manipulate data because its location must be determined first.

Another data management scheme is associative memories. Typically associative memories use hash codes that return an arbitrary memory location for a data element (key). Hashing codes are commonly used in large database applications. Unfortunately, present hashing codes suffer from a large number of collisions as the memory store approaches 70% full. The collision management requires external memory management schemes that require extra processing and memory space.

Thus there exists a method of forming a hashing code that reduces or eliminates collisions.

BRIEF DESCRIPTION OF THE DRAWINGS

FIG. 2 is a schematic diagram of a memory store in accordance with one embodiment of the invention;

FIG. 3 is a schematic diagram of a memory store in accordance with one embodiment of the invention;

FIG. 4 is a schematic diagram of a memory store in accordance with one embodiment of the invention;

FIG. 5 is a schematic diagram of a memory store in accordance with one embodiment of the invention;

FIG. 6 is a schematic diagram of a memory store in accordance with one embodiment of the invention;

FIG. 7 is a schematic diagram of a memory store in accordance with one embodiment of the invention;

FIG. 8 is a schematic diagram of a memory store in accordance with one embodiment of the invention;

FIG. 11 is an example of a transform set in accordance with one embodiment of the invention;

DETAILED DESCRIPTION

A method of forming a hashing code includes the steps of: first selecting a first linear feedback transform generator that is perfect over a first range. A maximum key length is determined next. When the maximum key length is greater than the first range for a transform, it is determined if a no collisions allowed condition exists. When the no collisions allowed condition exists, it is determined if the maximum key length is less than double the first range. When the maximum key length is less than double the first range, a first transform for a first part of a key is determined. A second transform for the key is then calculated. Next, a first-second combined transform is formed by concatenating the first transform and the second transform, wherein a first portion of the first-second combined transform is an address and a second portion of the first-second combined transform is a confirmer. This system allows the transform length to be equal to the maximum key length. By starting with a "perfect" transform generator, the system ensures that there is no possibility of a collision. A perfect transform generator is one that provides a unique transform for every possible key of a certain length. An example of such a transform is a cyclical redundancy code.

Figure 1:
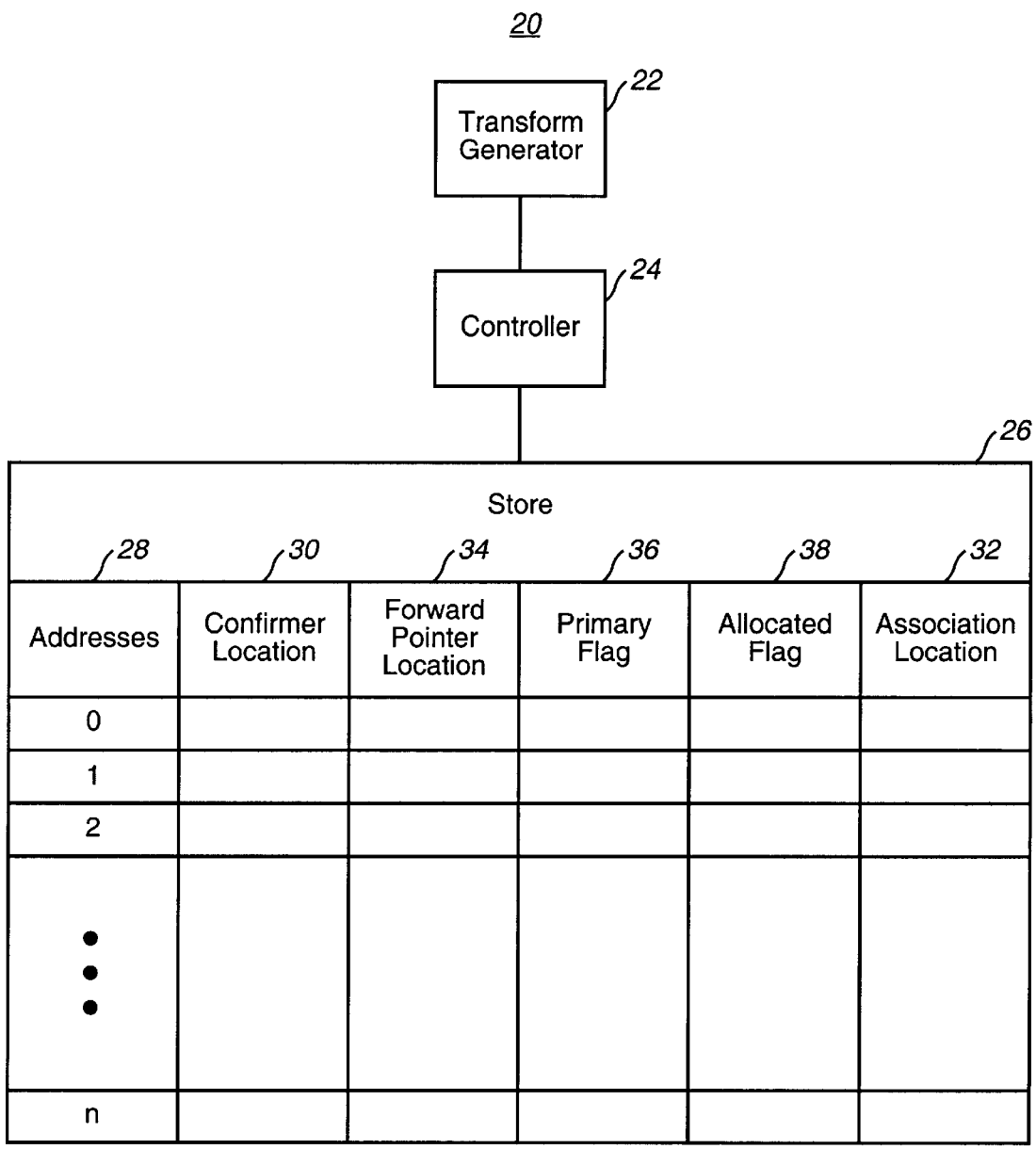
FIG. 1 is a block diagram of a memory management system in accordance with one embodiment of the invention.

FIG. 1 is a block diagram of a memory management system 20 in accordance with one embodiment of the invention. The memory management system 20 has three main elements: a transform generator 22; a controller 24 and a store (memory) 26. The transform generator determines an address 28 and a confirmer 30 from a key. The key is how the data is stored and looked up. For instance, a telephone information service would want a list of all the customer's names and telephone numbers. An operator would look up a telephone by a customer's name. The customer's name is the key and the telephone number may be the association.

The transform generator 22 receives the key and performs a mathematical process that returns the address 28 and confirmer 30. The address 28 and confirmer 30 together are called the icon or transform of the key. The ideal mathematical operation provides an even distribution of addresses even when the keys are not evenly distributed. In addition, the ideal mathematical operation does not result in a collision (same address and same confirmer) for different keys. Any mathematical operation that meets these criteria is acceptable. However, other mathematical operations may also be acceptable. One polynomial code that performs well against these criteria is (1E543279765927881).

The controller 24 stores or looks up an association 32 based on the address 28 and confirmer 30. The store 26 contains the confirmer location 30, a forward pointer location 34, a primary flag 36 and an allocated flag 38. A lookup command requires the controller to determine a first address (lookup address) and first confirmer (lookup confirmer) upon receiving a first key. The controller then determines if an allocated flag is set. When the allocated flag is set, the controller compares the first confirmer to a stored confirmer at the first address. When the stored confirmer and the first confirmer are the same the controller reads a stored association. The purpose of these locations will be explained in more detail with respect to FIGS. 2–8.

FIG. 2 is a schematic diagram of a memory store 50 in accordance with one embodiment of the invention. The store 50 shows an example with sixteen addresses. Generally, the number of address available will be based on a factor of two, for instance, 8, 16, 32, etc. The store 50 is merely a simple example to demonstrate how a store is initialized. In the example, the confirmer locations 52 contain a reverse pointer 54. The confirmer location 52 for address one is shown as zero. The forward pointer locations 56 each contain a forward pointer 58. The primary flag locations 60 are shown as zero's (unset). However, the primary flag locations 60 are free until an entry has been stored at the address. The allocated flag locations 62 are initialized to zero (unset). The association locations 64 are free and have no entries in this example. Note that an association is not required for the invention. In one embodiment the reverse pointer 54 is stored in a combination of free locations 52, 60, 64. The free locations upon initialization are the confirmer location 52, the primary flag location 60 and the association location 64.

The initialization process requires specifying a store 50 having a plurality of addresses 66. A confirm location 52 is defined for the each of the plurality of addresses 66. Next, a forward pointer location 56 for each of the addresses is defined. A forward address pointer 58 is entered for the forward pointer location for each of the plurality of addresses. The primary flag location 60 and allocated flag location 62 are defined for each of the addresses 66. An association location 64 is defined for each of the addresses. A reverse address pointer 54 is then entered in a free location for each of the addresses 66. As a result we have a doubly linked free list (forward and reverse pointers).

FIG. 3 is a schematic diagram of a memory store 50 in accordance with one embodiment of the invention. The figure illustrates a store at address five 70 assuming an initial state shown in FIG. 2. When the controller receives a store request, it sends a key to the transform generator. The transform generator returns an address (store address) and a confirmer (store confirmer). The controller then proceeds to store an association and confirmer at the address. The storing process requires that the controller first determines if the allocate flag 62 is set at the one of the plurality of address returned by the transform generator. When the allocated flag is not set, the controller moves to a reverse address indicated by the reverse pointer address. In the figures we see that the allocated flag 72 is not set for address five (first address) 70 in FIG. 2. As a result we can store an association at address five 70. The reverse address pointer 74 at address five 70 is address four 76. Thus we move to address four (reverse address) 76 and update the forward pointer at address four 76 to equal the forward pointer at address five 70. Thus we see that the forward pointer 78 (FIG. 3) at address four 76 is six. Address six is the next (forward) free address. Next the controller moves to the forward address 80 pointed to by the forward pointer 82 at the address five 70 (See FIG. 2). At address six (forward address) 80 we set the reverse pointer 84 equal to the reverse pointer 74 at address five 70. Next the confirmer (C1, first confirmer) 86 is entered at confirmer location 52 for the address five 70. The forward pointer 88 is set to point to address five. When there are no collisions, the forward pointer of a used address points to itself. The primary flag 90 and the allocated flag 92 are set. The association (A1) 94 is stored in the association location for address five. The store 50 of FIG. 3 shows an example of the state of store 50 after a store operation at address five.

FIG. 4 is a schematic diagram of a memory store 50 in accordance with one embodiment of the invention. FIG. 4 shows the state of store 50 after a collision store at address five. FIG. 4 assumes that the initial state of the store 50 before the collision store is shown in FIG. 3. The controller receives a key and association for store. The transform generator returns an address of five. The controller checks if the allocated flag 92 is set at address five 70. When the allocated flag 92 is set, the controller determines if the primary flag 90 is set. When the primary flag 90 is set, the controller moves to a next free address. The next address can be found by forward searching or backwards searching. FIG. 4 shows an example where forward searching is used. The controller moves to the next address (second address) 80 and determines if the allocated flag is set. When the allocated flag is not set, then the address is the next free address. The next free address 80 is address six. The forward pointer 88 at address five is set to address six. The forward pointer 78 at address four is updated to equal the forward pointer at address six 80 (i.e., seven). The reverse pointer 100 at address seven 102 is set equal to reverse pointer 84 at address six 80. The confirmer (C2, second confirmer) 104 can then be stored at address six 60. The forward pointer 106 is set equal to five. The allocated flag 108 is set and the association (A2) 110 is stored.

FIG. 5 is a schematic diagram of a memory store 50 in accordance with one embodiment of the invention. FIG. 5 shows the state the store 50 after "secondary collision" store at address six assuming that FIG. 4 represents the initial condition of the store 50. The controller receives a key and an association for store. The transform generator returns the address six 80. The controller checks the allocated flag 108 (FIG. 4) and determines that address six 80 is allocated. The controller then checks the primary flag 60 at address six 80 and determines that the primary flag is not set. This tells the controller that the store at address six 80 is a collision store, not a primary store. The controller finds a free address (i.e, address seven 102). A free address is an address in which the allocated flag 62 is not set. The information stored at address six 80 (FIG. 80) needs to be moved to address seven 102. First the reverse pointer 120 at address eight 122 has to be updated to equal the reverse pointer at address seven 102 (FIG. 4). Next the forward pointer 78 at address four 76 has to be updated to be equal to the forward pointer at address seven 102 (FIG. 4). The contents (first confirmer, assocition) of address six 80 (FIG. 4) can now be moved to address seven 102. The confirmer (C3) 124 and the association (A3) 126 are stored at address six 80. The forward pointer at address six 80 is update to be address six. The primary flag and the allocated flag are set at address six. The forward pointer of address five 70 is updated to read address seven 102.

FIG. 6 is a schematic diagram of a memory store 50 in accordance with one embodiment of the invention. FIG. 6 shows the state of the store 50 after a delete of the entry at address six assuming that FIG. 5 shows the initial state of the store. The controller receives a delete command and a key. The transform generator determines a delete address (address six) and delete confirmer. The controller compares the delete confirmer to the stored confirmer (C3) at address six 80. When the stored confirmer (C3) is the same as the delete confirmer, the stored confirmer 124 and the stored association 126 are deleted. Next the allocated flag 130 and the primary flag 132 are unset. The controller searches for a next free address. In this case the next free address is address eight 122. The forward pointer 88 at the delete address 80 (address six) is updated to the next free address 122. Note that this example uses a forward search for a free address, however a reverse search is possible as will be apparent to those skilled in the art. The reverse address pointer 134 at the delete address 80 is set equal to the reverse address at the next free address 122. The reverse address 136 at the next free address 122 is set equal to the delete address (i.e, address six). The previous free address is found using the reverse address 120 (FIG. 5) at the next free address 122. The forward pointer 138 at the previous free address is updated to equal the delete address 80. The doubly linked free list now completely updated.

FIG. 7 is a schematic diagram of a memory store 50 in accordance with one embodiment of the invention. FIG. 7 shows the state of the store 50 after a delete of the entry at address seven 102 assuming that FIG. 5 shows the initial state of the store. The controller receives a delete command and a key. The transform generator determines a delete address (address seven) and delete confirmer. The controller compares the delete confirmer to the stored confirmer (C2) at address seven 102. When the stored confirmer (C2) is the same as the delete confirmer, the stored confirmer 104 and the stored association (A2) are deleted. Next the allocated flag 140 is unset. The controller searches for a next free address (i.e., address eight 122). The controller then updates the reverse pointer 142 for the free address to equal the reverse pointer 120 at the next free address 122. The controller then updates the forward pointer 144 at the delete address to equal the next free address. The reverse pointer 146 of the next free address 122 is updated to equal the delete address. A reverse address (address four 76) has its forward address 148 updated to equal the delete address. The delete operation is complete.

FIG. 8 is a schematic diagram of a memory store 50 in accordance with one embodiment of the invention. FIG. 8 shows the state of the store 50 after a delete of the entry at address five 70 assuming that FIG. 5 shows the initial state of the store. The controller receives a delete command and a key. The transform generator determines a delete address (address five) and delete confirmer. The controller compares the delete confirmer to the stored confirmer (C1) at address five 70. When the stored confirmer (C1) is the same as the delete confirmer, the controller determines if the forward pointer 78 points to the delete address 70. When the forward pointer 78, does not point to the delete address (itself), then the controller moves the confirmer (C2) and association (A2) at the forward pointer address 102 to the delete address 70. The forward pointer 150 at the delete address 70 is updated to equal the delete address 70. A reverse pointer 152 at the forward pointer address 102 is updated using the next free address 122 reverse pointer 120. The forward pointer 154 at the forward pointer address 102 is set equal to the next free address 122. The forward pointer 156 at the reverse address 76 is set equal to the forward pointer address 102. The delete operation for a primary entry having a collision is now complete.

Thus there has been described a method of operating a memory management system that can be implemented in hardware or software and allows deletes of entries in an associative memory. The method and system provide a simple method of handling collisions that does not require extensive linked lists. This accomplished while providing the extremely fast lookup times of a CAM memory system. In addition, the system is very flexible and capable of handling from two entries to over a million entries, without significant performance degradation.

Figure 9:
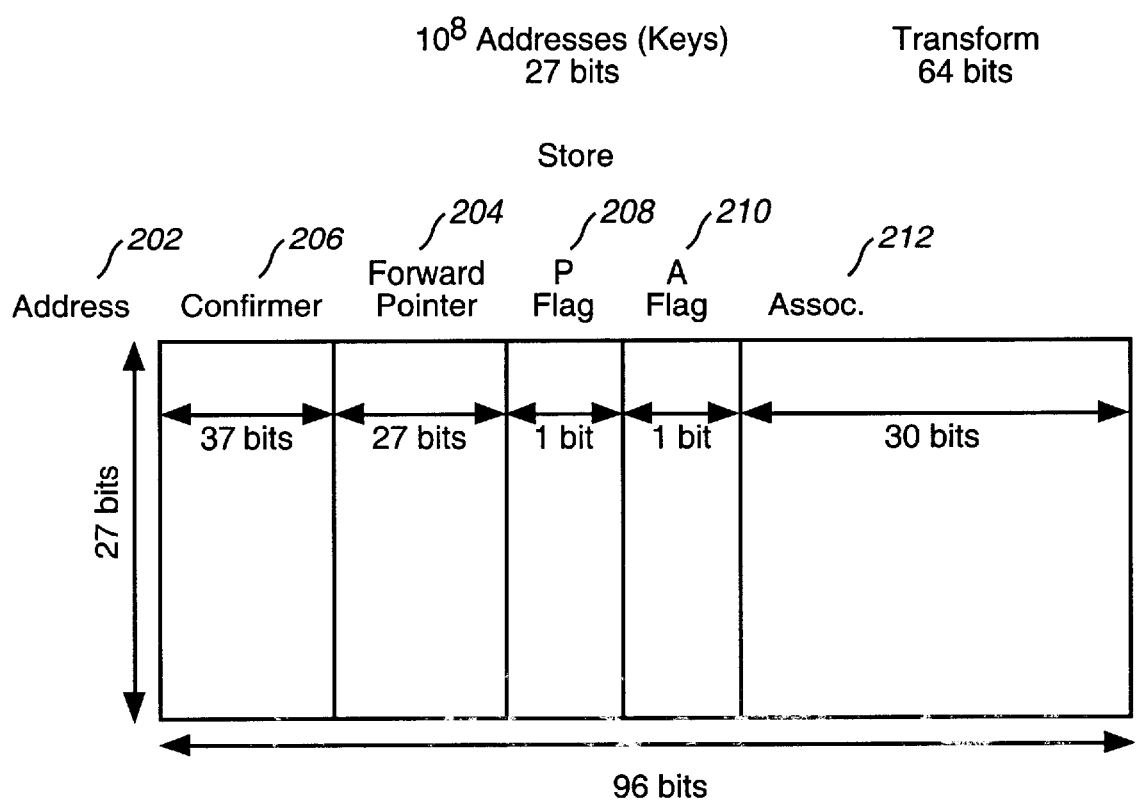
FIG. 9 is a schematic diagram of a memory store in accordance with one embodiment of the invention.
Figure 10:
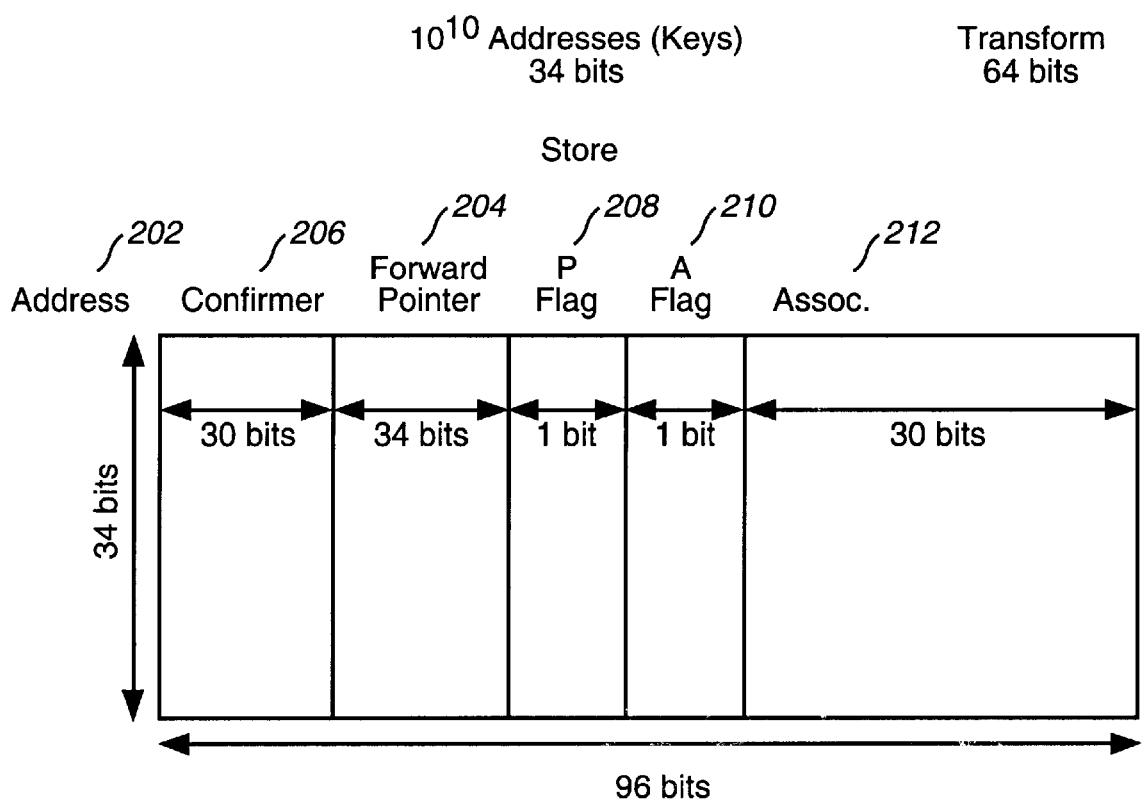
FIG. 10 is a schematic diagram of a memory store in accordance with one embodiment of the invention.

FIG. 9 is a schematic diagram of a memory store 200 in accordance with one embodiment of the invention. FIGS. 9 & 10 illustrate the versatility of the store to handle different numbers of entries. FIG. 9 shows an example of a store of the memory management system, when the required number of entries (addresses) is 100 Million. The system uses a transform that has sixty-four bits (first number of bits). A portion of the sixty-four bits is used as the address and the other portion is used as the confirmer. In this case the controller determines that the required number of entries requires an address 202 having an address number of bits equal to 27 bits. The forward pointer location 204 is set to have a forward pointer number of bits (twenty-seven) equal to the address number of bits. The confirmer location 206 is set to have a confirmer number of bits equal (thirty-seven) to the first number of bits (sixty-four—transform) less the forward pointer number of bits (twenty-seven). Note that the transform has to be large enough to cover the required number of entries. Ideally, the transform will be large enough (range of numbers) to cover more than the required number of entries. The primary flag location 208 and the allocation flag location 210 each requires one bit. The association 212 is optional, but in this example is shown as having thirty bits. Note that just to list all the potential transforms would require sixty-four bits. The store 200 without the optional association only requires sixty-six bits to store the entries or two more bits than listing all the transforms.

FIG. 10 is a schematic diagram of a memory store 200 in accordance with one embodiment of the invention. In this example, the store 200 needs to be able to handle 10 billion entries. As a result the address 202 is thirty-four bits. The forward pointer 204 is also set to thirty-four bits. The confirmer 206 is therefore set to have thirty bits. The size of the confirmer and forward pointer are traded to best accommodate and required number of entries. Note that the overall store is still ninety-six bits wide.

FIG. 11 is an example of a transform set in accordance with one embodiment of the invention. This example transform set is a cyclical redundancy code (CRC). A common method for understanding CRCs is that the key is first treated as a polynomial and is divided by a generator polynomial modulo 2 and the remainder is the CRC. Commonly the data is first multiplied by $x^n$, where n is equal to the order of the generator polynomial. In FIG. 11 the generator polynomial 300 is $x^3+x+1$. Two examples of how the CRC is determined are shown at the top of the figure. The examples show the CRC for the data samples of 0 and 1. The code vector 302 shows the data (key) in the four most significant digits and the CRC in the three least significant digits. The CRCs repeat after the first eight code vectors. However, note that the first eight code vectors contain every possible three digit CRC. This is defined as a perfect transform. Note that a perfect third order generator polynomial will produce a CRC that cycles through all possible second order polynomials [000–111] for the polynomials between (000) and (111).

Note that a perfect transform (e.g., CRC) for a first order (2-digit) CRC 304 is embedded within the second order CRC. Since the second order CRC is perfect there has to exist a subset of the transform (CRC) that is perfect for lower orders. This is an easy method for generating a reduced transform.

Figure 12:
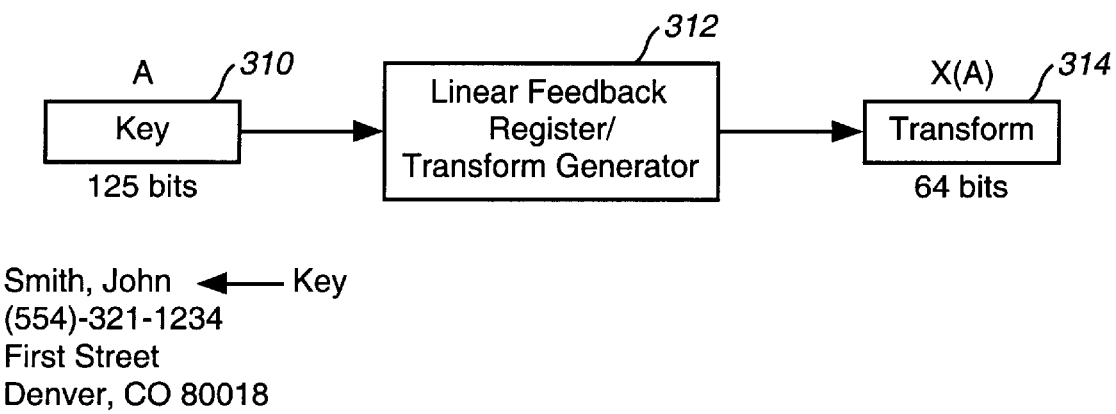
FIG. 12 is a schematic diagram of the steps used in converting a key to a transform in accordance with one embodiment of the invention.

FIG. 12 is a schematic diagram of the steps used in converting a key to a transform in accordance with one embodiment of the invention. A key 310 is shown to be 128 bits long. The key 310 in one embodiment may be the name Smith, John in a phone book. The key 310 allows you to lookup John Smith's address and phone number. In this example the key is assumed to be 128 bits long. The transform generator (linear feedback shift register) 312 converts the key 310 into a transform X(A) 314. The transform 314 is 64 bits long. Commonly a 64 bit transform is used for the associative memory.

Figure 13A:
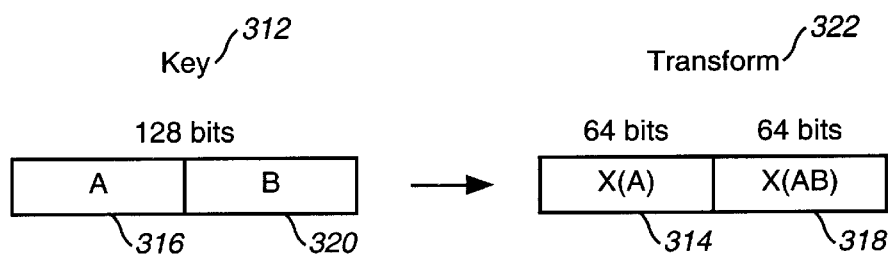
FIGS. 13a & b show two examples of how an extended transform is generated in accordance with one embodiment of the invention.

FIGS. 13a & b show two examples of how an extended transform is generated in accordance with one embodiment of the invention. When a transform longer than 64 bits is required an extended transform is formed. An extended transform is used when the key length is longer than 64 bits and no collisions are allowed. A collision (unresolvable) is when two different keys have the same transform. Assuming the 64 bit transform is perfect it will provide a unique transform for every possible 64 bit key. However, longer keys can produce unresolvable collisions. When this cannot be tolerated a longer transform is produced. Assuming the key is 128 bits the transform is form by forming a first transform X(A) 314 for a first portion 316 of the key 312. Note that when the first portion (A) 316 is 64 bits the first transform 314 is perfect. A second transform 318 is formed for both the first 316 and second 320 (64 bit or less portion) portion of the key AB 312. The first transform 314 is concatenated with the second transform 318 to form a first-second combined transform 322. Note that the first-second combined transform is 128 bits long. It can be shown that the first-second combined transform is perfect for every possible 128 bit key. Note if the key is longer than 64 bits but not 128 bits it may be converted into a 128 bit key by adding zeros. Commonly a portion of the second transform 318 is used as the address.

Figure 13B:
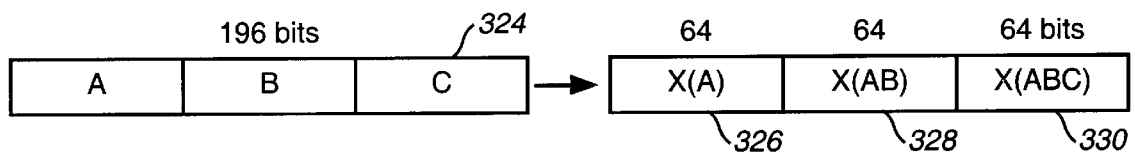

FIG. 13b shows how a 196 bit key 324 requiring no collisions can be handled. The key 324 is divided into three (A,B,C) equal 64 bit portions. A first transform X(A) 326 is formed. A second transform X(AB) 328 is formed and a third transform X(ABC) 330 is formed. The three transforms are concatenated to form a first-second-third combined transform 332. As will be apparent to those skilled in the art this technique can be used for keys that are not multiples of 64 bits in length.

Figure 14:
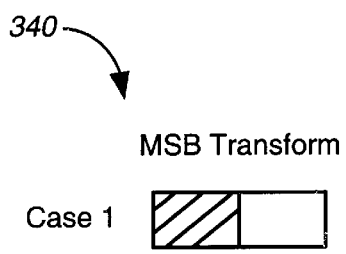
FIG. 14 is a schematic diagram of two examples for forming a reduced transform in accordance with one embodiment of the invention.

FIG. 14 is a schematic diagram of two examples for forming a reduced transform in accordance with one embodiment of the invention. When the key length is less than 64 bits (or a standard transform length) or the required probability of collision does not require a 64 bit transform, a perfect reduced transform can be found in the complete set of transforms for the standard length. This was demonstrated with the transform in FIG. 11. The reduced transform in the first case 340 is formed by using the only the least significant bits (throwing away the most significant bit MSB). Once the unnecessary MSBs are removed the reduced transform set is checked to see that it is perfect (there are no repeating transforms). When eliminating the unnecessary MSBs does not provide a perfect transform, bits can be selectively removed from the complete transform set. The shaded areas in case 2 are bits that have been removed to form a reduced transform.

Note that an extended transform of FIG. 13 can be reduced to form a perfect transform of almost any size.

Figure 15:
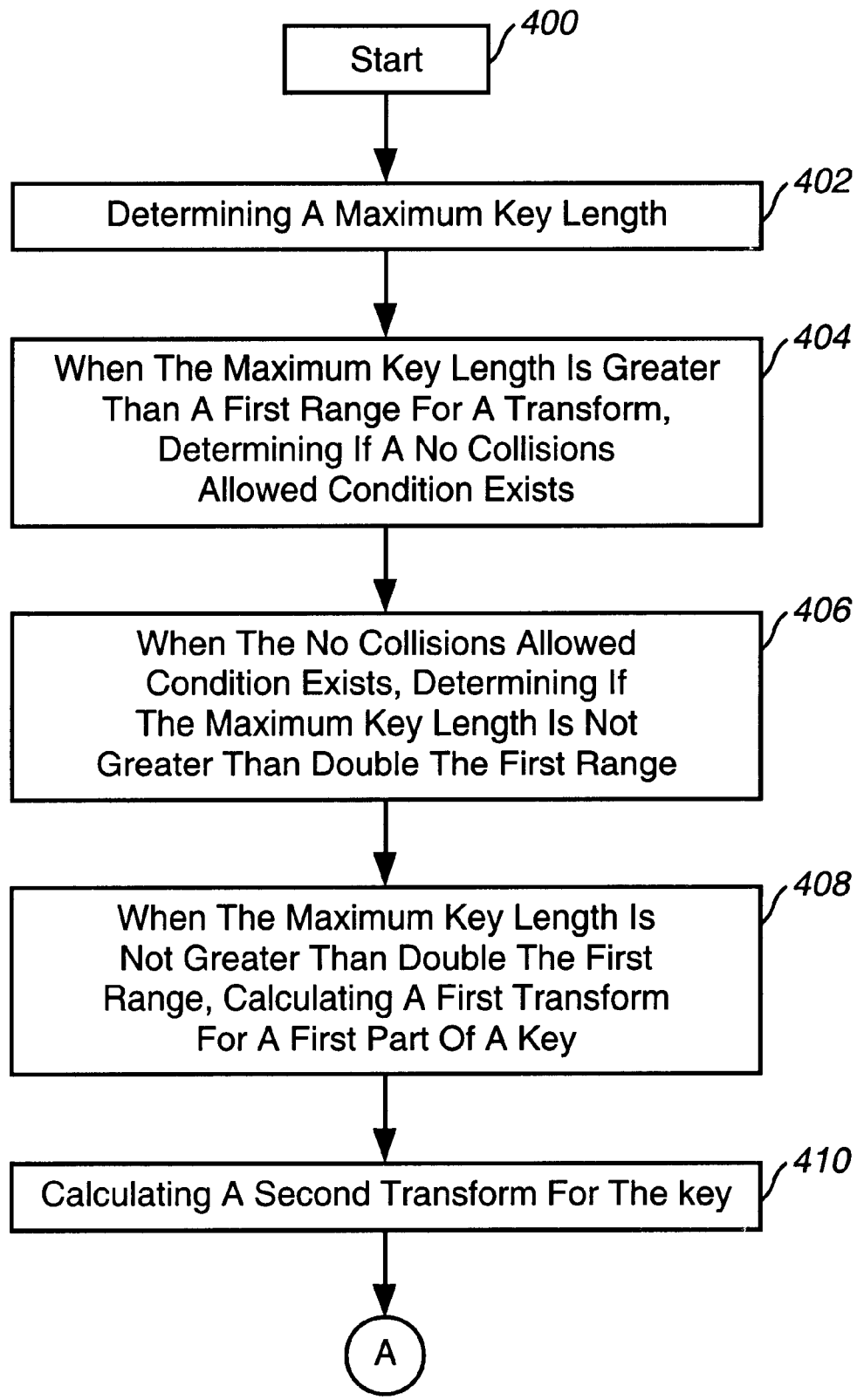
FIGS. 15 & 16 are a flow chart of the steps used in a method of forming a hashing code in accordance with one embodiment of the invention.
Figure 16:
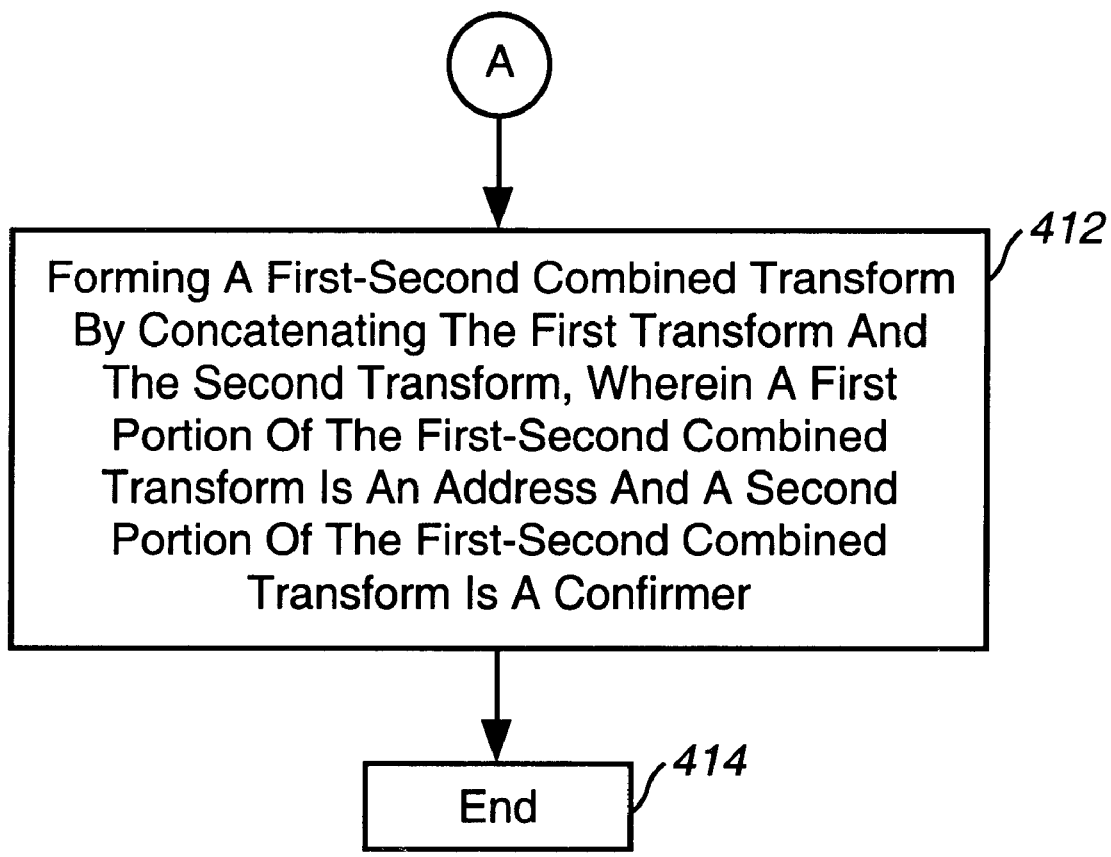

FIGS. 15 & 16 are a flow chart of the steps used in a method of forming a hashing code in accordance with one embodiment of the invention. The process starts, step 400, by determining a maximum key length at step 402. When the maximum key length is greater than a first range for a transform, it is determined if a no collisions allowed condition exists at step 404. When the no collisions allowed condition exists, it is determined if the maximum key length is not greater than double the first range at step 406. When the maximum key length is not greater than double the first range, a first transform is calculated for a first part of a key at step 408. A second transform is calculated for the key at step 410. At step 412, concatenating the first transform and the second transform forms a first-second combined transform. A first portion of the first-second combined transform is an address and a second portion of the first-second combined transform is a confirmer which ends the process at step 414. When the no collisions allowed condition does not exist, an allowed probability of collision is determined. A probability of collision is then determined by dividing the maximum number of keys (entries) by the total number of unique transforms. When the probability of collision is less than the allowed probability of collision, a portion of the second transform is used as the address and a second portion of the second transform is used as the confirmer. In another words a transform having the first range is all that is necessary to meet the system requirements.

When the probability of collision is not less than the allowed probability of collision, a first portion of the first-second combined transform is used as an address and a second portion of the first-second combined transform is a confirmer.

In one embodiment, a maximum number of keys are determined. An address length is set so that a number of addresses is not less than the maximum number of keys. A confirmer length is set equal to a first-second transform length less the address length.

In one embodiment when the maximum key length is not greater than the first range, a first portion of the first transform is used as the address.

In one embodiment when the maximum key length is greater than double the first range, it is determined if the no collisions allowed condition exists. When the no collisions allowed condition exists, it is determined if the maximum key length is not greater than three times the first range. When the maximum key length is not greater than three times the first range, a first transform is determined for a first part of the key. A second transform is calculated for a second part of the key. A third transform is calculated for the key. A first-second-third combined transform by concatenating the first transform, the second transform and the third transform. A first portion of the first-second-third combined transform is the address and a second portion of the first-second-third combined transform is the confirmer.

Figure 17:
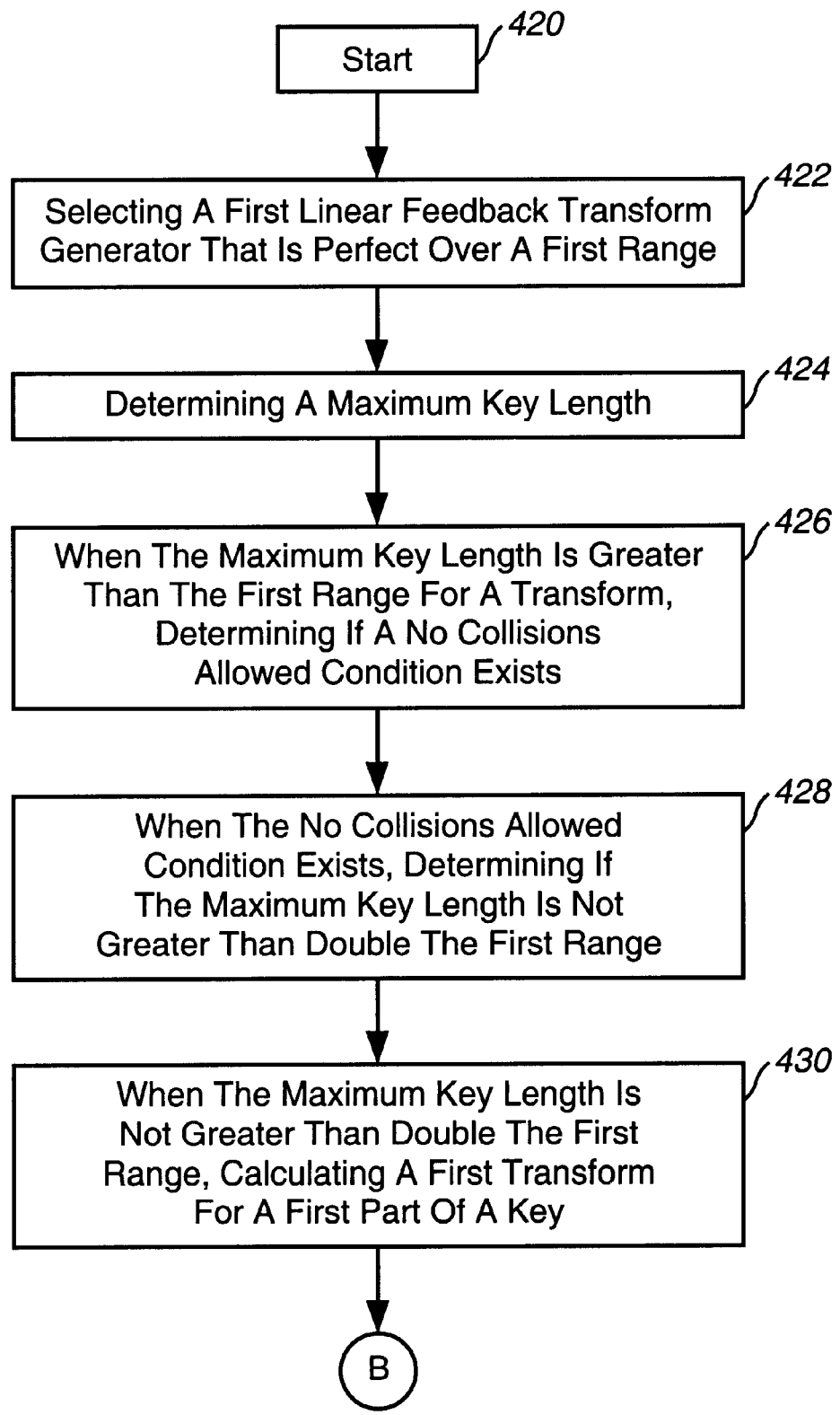
FIGS. 17 & 18 are a flow chart of the steps used in a method of forming a hashing code in accordance with one embodiment of the invention.
Figure 18:
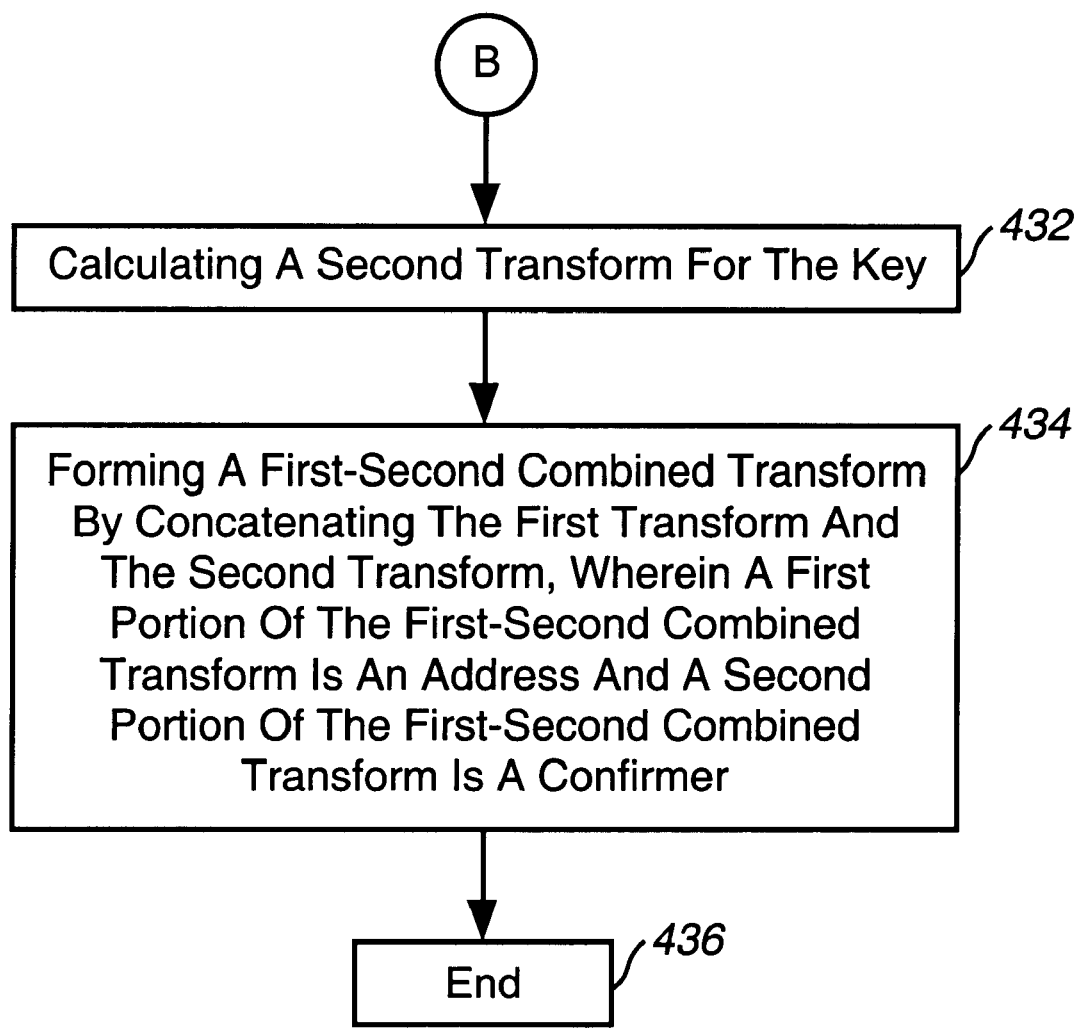

FIGS. 17 & 18 are a flowchart of the steps used in a method of forming a hashing code in accordance with one embodiment of the invention. The process starts, step 420, by selecting a first linear feedback transform generator that is perfect over a first range at step 422. A maximum key length is determined at step 424. When the maximum key length is greater than the first range for a transform, it is determined if a no collisions allowed condition exists at step 426. When the no collisions allowed condition exists, it is determined if the maximum key length is not greater than double the first range at step 428. When the maximum key length is not greater than double the first range, a first transform is calculated for a first part of a key at step 430. A second transform is calculated for the key at step 432. At step 434 concatenating the first transform and the second transform forms a first-second combined transform. A first portion of the first-second combined transform is used as an address and a second portion of the first-second combined transform is the confirmer which ends the process at step 436. When the no collisions allowed condition does not exist, an allowed probability of collision is determined. A probability of collision is determined. When the probability of collision is less than the allowed probability of collision, a maximum number of keys is determined. An address length is selected so that a number of addresses is not less than the maximum number of keys. When the address is less than the first range, it is determined if a reduced transform will provide an acceptable probability of collision. When the reduced transform will provide an acceptable probability of collision, a complete transform set for the first linear feedback transform generator is determined. An example of a complete transform for a particular generator polynomial is shown in FIG. 11. A portion of the complete transform set that is perfect is selected to form a second transform set (e.g., FIG. 11, 304). The second transform set is used as the hashing code. A confirmer length is set equal to a reduced transform length less the address length.

Figure 19:
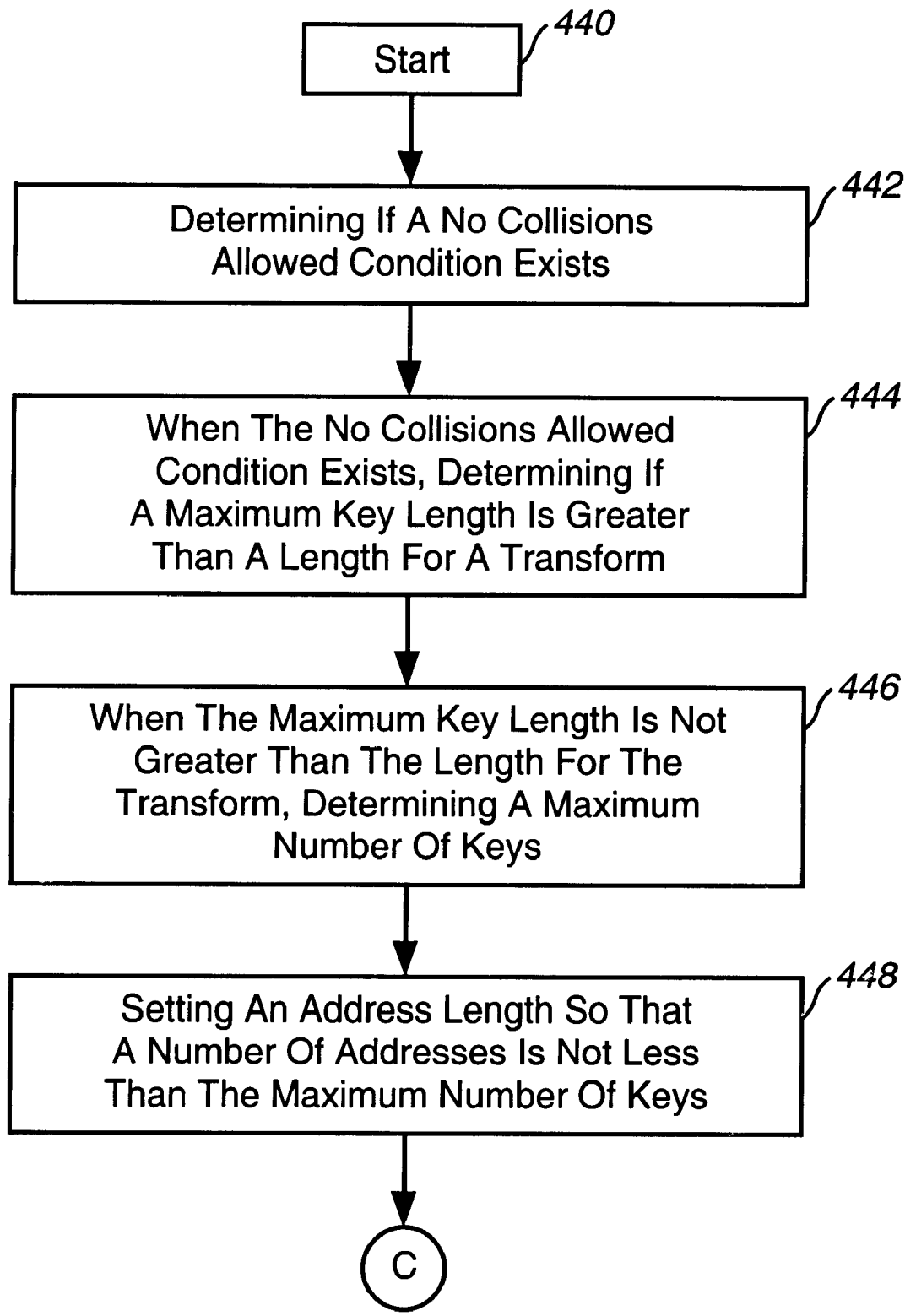
FIGS. 19 & 20 are a flow chart of the steps used in a method of forming a hashing code in accordance with one embodiment of the invention.
Figure 20:
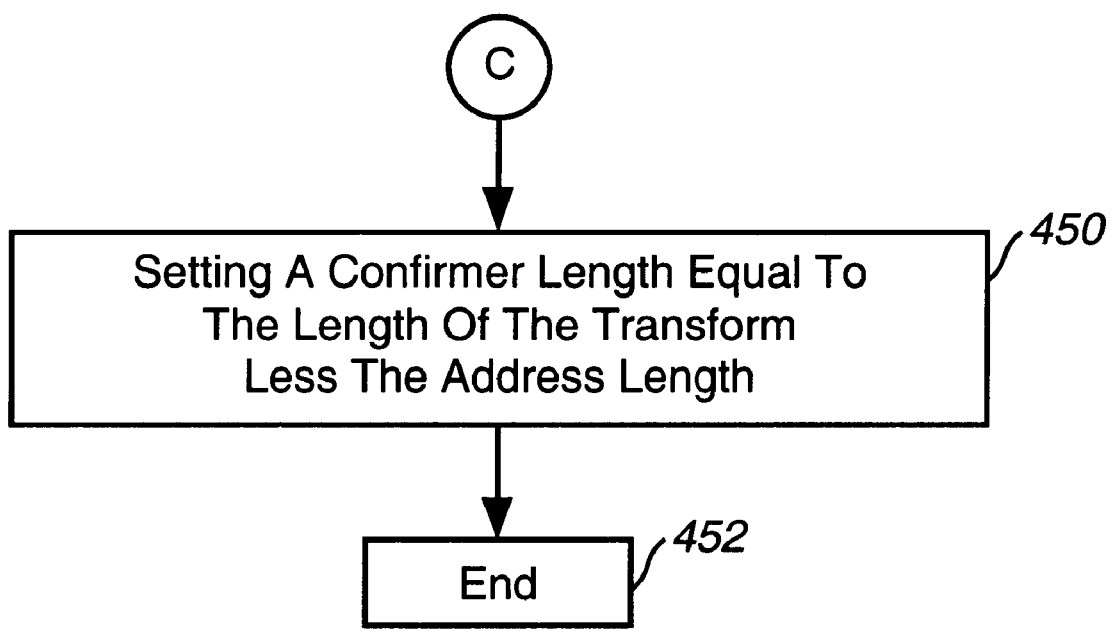

FIGS. 19 & 20 are a flow chart of the steps used in a method of forming a hashing code in accordance with one embodiment of the invention. The process starts, step 440, by determining if a no collision allowed condition exists at step 442. When the no collisions allowed condition exists, it is determined if a maximum key length is greater than a length for a transform at step 444. When the maximum key length is not greater than a length for a transform, a maximum number of keys is determined at step 446. An address length is set so that a number of addresses is not less than the maximum number of keys at step 448. At step 450 a confirmer length is set equal to the length of the transform length less the address length which ends the process at step 452. When the maximum key length is greater than the length for the transform, it is determined if the maximum key length is not greater than double the first range. When the maximum key length is not greater than double the first range, a first transform is calculated for a first part of a key. A second transform is calculated for the key. Concatenating the first transform and the second transform forms a first-second combined transform. A first portion of the first-second combined transform is an address and a second portion of the first-second combined transform is a confirmer.

In one embodiment when the key length is greater than the length for the transform and the no collisions allowed condition does not exist, an allowed probability of collisions is determined. A probability of collision is determined. When the probability of collision is less than the allowed probability of collision, a portion of the transform is used as the address and a second portion of the transform is used as the confirmer.

When the probability of collision is not less than the allowed probability of collision, a first transform is calculated for a first part of a key. A second transform is calculated for the key. Concatenating the first transform and the second transform forms a first-second combined transform. Next it is determined if a first-second combined transform set has an acceptable probability of collision. When the first-second combined transform set has the acceptable probability of collision, a first portion of the first-second transform is an address and a second portion of the first-second combined transform is a confirmer.

When the first-second combined transform set does not have the acceptable probability of collision, a first transform is calculated for a first part of the key. A second transform is calculated for a second part of the key and a third transform is calculated for the key. Concatenating the first, second and third transform forms a first-second-third transform combined transform. A first portion of the first-second-third transform combined transform is the address and a second portion of the first-second-third combined transform is the confirmer.

When the maximum key length is less than the length for the transform and the no collisions allowed condition exists, setting a transform length equal to at least the maximum key length. A complete transform set is determined. A portion of the complete transform set is selected that is perfect to form a second transform set. The second transform set is the hashing code.

When the no collisions allowed condition does not exist, it is determined if a reduced transform will provide an acceptable probability of collision. When the reduced transform will provide an acceptable probability of collision, a complete transform set is determined for the first linear feedback transform generator. A portion of the complete transform is selected that is perfect to form the second transform set. The second transform set is the hashing code.

In one embodiment a transform is selected having an appropriate length (meets system requirements). A maximum number of keys is determined. An address length is set so that a number of addresses is not less than the maximum number of keys. A confirmer length is set equal to the appropriate length less the address length.

Figure 21:
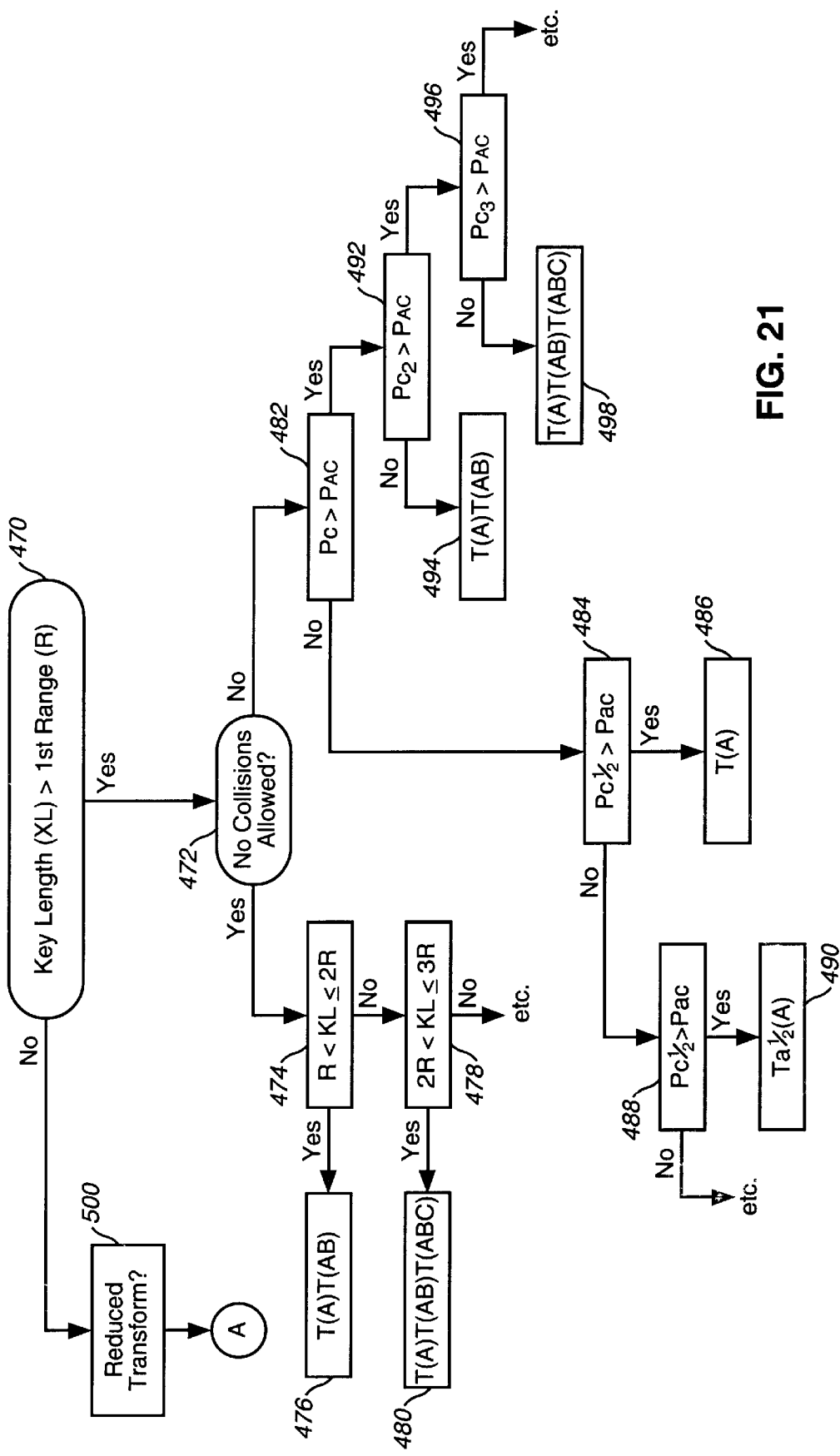
FIGS. 21 & 22 are a flow chart of the steps used in a method of forming a hashing code in accordance with one embodiment of the invention.
Figure 22:
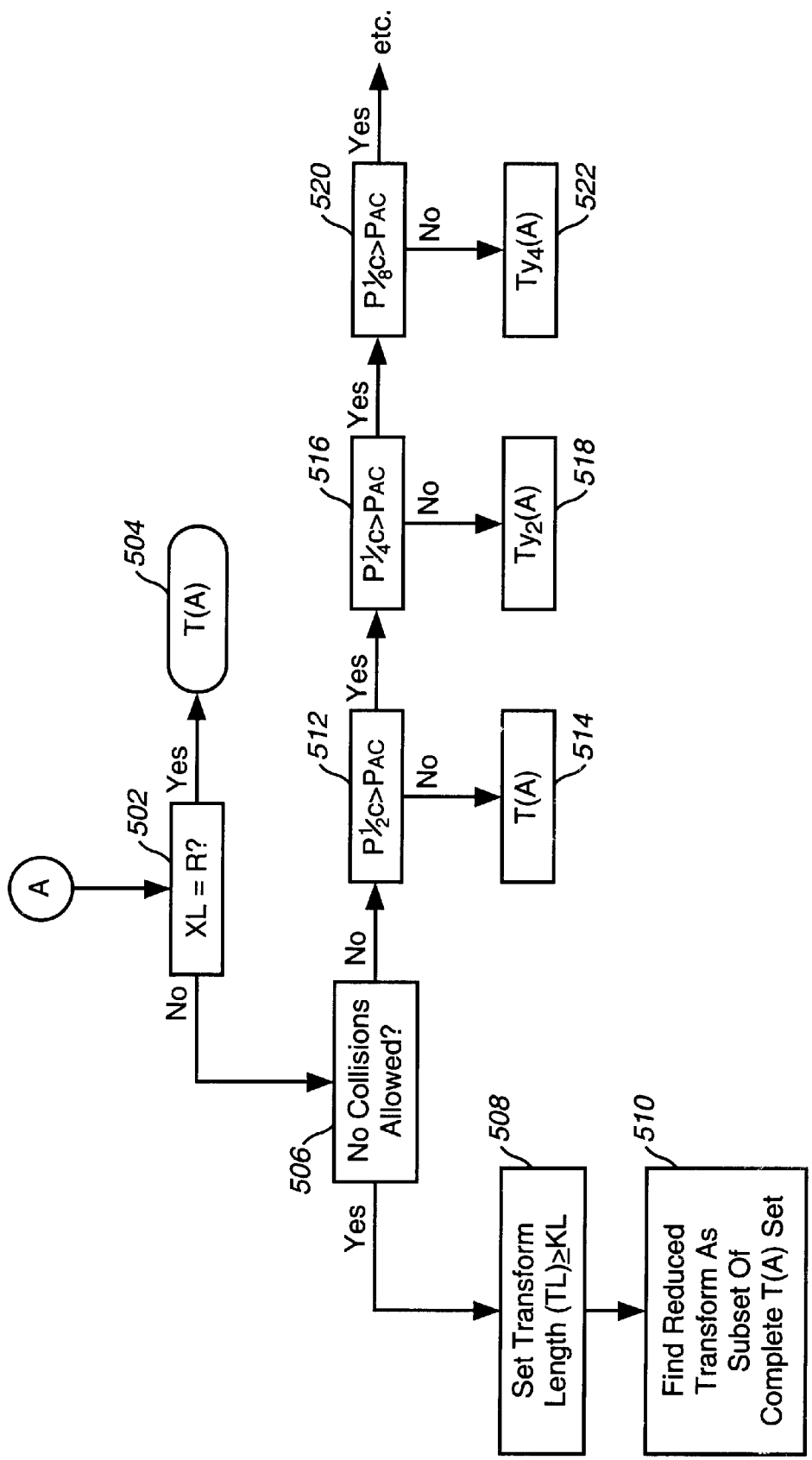

FIGS. 21 & 22 are a flowchart of the steps used in a method of forming a hashing code in accordance with one embodiment of the invention. The process starts by determining if a key length is greater than a first range for a transform at step 470. When the key length is greater than a first range for a transform, it is determined if a no collisions allowed condition exists at step 472. When no collisions allowed condition exists, it is determined if the key length is not greater than double the first range at step 474. When the key length is not greater than double the first range, a first-second combined transform is used as the hashing code at step 476. When the key length is greater than double the first range, it is determined if the key length is not greater than three times the first range at step 478. When the key length is not greater than three times the first range, a first-second-third transform is used as the hashing code at step 480. This process can be repeated for even larger key lengths.

When the no collisions allowed condition does not exists at step 472, it is determined if the probability of collision ($P_c$) is greater than an allow probability of collision ($P_{ac}$) at step 482. When the probability of collision ($P_c$) is not greater than the allow probability of collision ($P_{ac}$), it is determined if the probability of collision for a one-half reduced transform ($P_{c\frac{1}{2}}$) is greater than the allowed probability of collision ($P_{ac}$) at step 484. When the probability of collision for a one-half reduced transform ($P_{c\frac{1}{2}}$) is greater than the allowed probability of collision ($P_{ac}$), a first transform [T(A)] is used as the hashing code at step 486. When the probability of collision for a one-half reduced transform ($P_{c\frac{1}{2}}$) is not greater than the allowed probability of collision ($P_{ac}$), it is determined if the probability of collision for a one-fourth reduced transform ($P_{c\frac{1}{4}}$) is greater than the allowed probability of collision ($P_{ac}$) at step 484. When the probability of collision for a one-fourth reduced transform ($P_{c\frac{1}{4}}$) is greater than the allowed probability of collision ($P_{ac}$), using the one-half transform [$T_{1/2}(A)$] as the hashing code at step 490. Note that process can be extended. The term one-half transform is a transform with half as many bits as the standard transform. While the most likely transforms would be multiples of two, transforms of other lengths may be used.

When the probability of collision ($P_c$) is not greater than an allow probability of collision ($P_{ac}$) at step 482, it is determined if the probability of collision for a first-second transform ($P_{c2}$) is greater than the allowed probability of collision ($P_{ac}$) at step 492. When the probability of collision for a first-second transform ($P_{c2}$) is not greater than the allowed probability of collision ($P_{ac}$), using the first-second combined transform [T(A)T(AB)] as the hashing code at step 494. When the probability of collision for a first-second transform ($P_{c2}$) is greater than the allowed probability of collision ($P_{ac}$), it is determined if the probability of collision for a first-second-third transform ($P_{c3}$) is greater than the allowed probability of collision ($P_{ac}$) at step 496. When the probability of collision for a first-second-third transform ($P_{c3}$) is not greater than the allowed probability of collision ($P_{ac}$), using the first-second-third combined transform [T(A)T(AB)T(ABC)] as the hashing code at step 498. As will be apparent to those skilled in the art this process can be extended to longer transforms. Note that whole multiplies of the base transform are shown, however fractional multiples of the base transform can also be used.

When the key length is not greater than a first range for a transform at step 470, a reduced transform is investigated at step 500. At step 502 it is determined if the key length is equal to the first range. When the key length is equal to the first range, the first transform [T(A)] is used as the hashing code at step 504. When the key length is not equal to the first range, it is determined if a no collisions allowed condition exists at step 506. When the no collisions allowed condition exists, the transform length is set greater than or equal to the key length at step 508. A reduced transform set is formed by using a perfect subset of the complete transform set at step 510.

When the no collisions allowed condition does not exist at step 506, it is determined if the probability of collision for a one-half reduced transform ($P_{c\frac{1}{2}}$) is greater than the allowed probability of collision ($P_{ac}$) at step 512. When probability of collision for a one-half reduced transform ($P_{c\frac{1}{2}}$) is greater than the allowed probability of collision ($P_{ac}$), using the first transform as the hashing code at step 514. When the probability of collision for a one-half reduced transform ($P_{c\frac{1}{2}}$) is not greater than the allowed probability of collision ($P_{ac}$), it is determined if a probability of collision for a one-fourth reduced transform ($P_{c\frac{1}{4}}$) is greater than the allowed probability of collision ($P_{ac}$) at step 516. When the probability of collision for a one-fourth reduced transform ($P_{c\frac{1}{4}}$) is greater than the allowed probability of collision ($P_{ac}$), using the one-half reduced transform at step 518. When the probability of collision for a one-fourth reduced transform ($P_{c\frac{1}{4}}$) is not greater than the allowed probability of collision ($P_{ac}$), it is determined if a probability of collision for a one-eighth reduced transform ($P_{c\frac{1}{8}}$) is greater than the allowed probability of collision ($P_{ac}$) at step 520. When the probability of collision for a one-eighth reduced transform ($P_{c\frac{1}{8}}$) is greater than the allowed probability of collision ($P_{ac}$), a one-fourth reduced transform is used as the hashing code at step 522. This process can be continued as long as the transform size is greater than the number of keys.

Thus there has been described a method of generating a hashing code that reduces or eliminates (unresolvable) collisions.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of determining an address and confirmer from a key for an associative memory, comprising the steps of:
   a) determining a maximum key length;
   b) when the maximum key length is greater than a first range for a transform, determining if a no collisions allowed condition exists;
   c) when the no collisions allowed condition exists, determining if the maximum key length is not greater than double the first range;
   d) when the maximum key length is not greater than double the first range, calculating a first transform for a first part of a key;
   e) calculating a second transform for the key; and
   f) forming a first-second combined transform by concatenating the first transform and the second transform, wherein a first portion of the first-second combined transform is an address and a second portion of the first-second combined transform is a confirmer.

2. The method of claim 1, further including the steps of:
   g) when the no collisions allowed condition does not exist, determining an allowed probability of collision;
   h) determining a probability of collision;
   i) when the probability of collision is less than the allowed probability of collision, using a portion of the second transform as the address and a second portion of the second transform as the confirmer.

3. The method of claim 2, further including the steps of:
   j) when the probability of collision is not less than the allowed probability of collision, using a portion of the first-second combined transform as the address and a second portion of the first-second combined transform as the confirmer.

4. The method of claim 1, further including the steps of:
   g) determining a maximum number of keys;
   h) setting an address length so that a number of addresses is not less than the maximum number of keys.

5. The method of claim 4, further including the step of:
   i) setting a confirmer length equal to a first-second combined transform length less the address length.

6. The method of claim 1, further including the steps of:
   g) when the maximum key length is not greater than the first range, using a first portion of the first transform as the address.

7. The method of claim 1, further including the steps of:
   g) when the maximum key length is greater than double the first range, determining if the no collisions allowed condition exists;
   h) when the no collisions allowed condition exists, determining if the maximum key length is not greater than three times the first range;
   i) when the maximum key length is not greater than three times the first range, calculating the first transform for the first part of the key;

j) calculating the second transform for a second part of the key;

k) calculating a third transform for the key; and l) forming a first-second-third combined transform by concatentating the first transform, the second transform and the third transform, wherein a first portion of the first-second-third combined transform is the address and a second portion of the first-second-third combined transform is the confirmer.

8. A method of forming a hashing code, comprising:

a) selecting a first linear feedback transform generator that is perfect over a first range;

b) determining a maximum key length;

c) when the maximum key length is greater than the first range for a transform, determining if a no collisions allowed condition exists;

d) when the no collisions allowed condition exists, determining if the maximum key length is not greater than double the first range;

e) when the maximum key length is not greater than double the first range, calculating a first transform for a first part of a key;

f) calculating a second transform for the key; and g) forming a first-second combined transform by concatenating the first transform and the second transform, wherein a first portion of the first-second combined transform is an address and a second portion of the first-second combined transform is a confirmer.

9. The method of claim 8, further including the steps of:

h) when the no collisions allowed condition does not exist, determining an allowed probability of collision;

i) determining a probability of collision over the first range;

j) when the probability of collision is less than the allowed probability of collision, determining a maximum number of keys;

k) determining an address length so that a number of addresses is not less than the maximum number of keys.

10. The method of claim 9, further including the steps of:

l) when the address length is less than the first range, determining if a reduced transform will provide an acceptable probability of collision;

m) when the reduced transform will provide an acceptable probability of collision, determining a complete transform set for the first linear feedback transform generator;

n) selecting a portion of the complete transform set that is perfect to form a second transform set, wherein the second transform set is the hashing code.

11. The method of claim 10, further including the steps of:

o) setting a confirmer length equal to a reduced transform length less the address length.

12. A method of forming a hashing code, comprising:

a) determining if a no collisions allowed condition exists;

b) when the no collisions allowed condition exists, determining if a maximum key length is greater than a length for a transform;

c) when the maximum key length is not greater than the length for the transform, determining a maximum number of keys;

d) setting an address length so that a number of addresses is not less than the maximum number of keys; and e) setting a confirmer length equal to the length of the transform less the address length.

13. The method of claim 12, further including the steps of:

f) when the maximum key length is greater than the length for the transform, determining if the maximum key length is not greater than double the first range;

g) when the maximum key length is not greater than double the first range, calculating a first transform for a first part of a key;

h) calculating a second transform for the key; and i) forming a first-second combined transform by concatenating the first transform and the second transform, wherein a first portion of the first-second combined transform is an address and a second portion of the first-second combined transform is a confirmer.

14. The method of claim 12, further including the steps of:

f) when the key length is greater than the length for the transform and the no collisions allowed condition does not exist, determining an allowed probability of collision;

g) determining a probability of collision;

h) when the probability of collision is less than the allowed probability of collision, using a portion of the transform as the address and a second portion of the transform as the confirmer.

15. The method of claim 14, further including the steps of:

i) when the probability of collision is not less than the allowed probability of collision, calculating a first transform for a first part of a key;

j) calculating a second transform for the key;

k) forming a first-second combined transform by concatenating the first transform and the second transform;

l) determining if a first-second combined transform set has an acceptable probability of collision;

m) when the first-second combined transform set has the acceptable probability of collision, setting a first portion of the first-second combined transform as an address and a second portion of the first-second combined transform as a confirmer.

16. The method of claim 15, further including the steps of:

n) when the first-second combined transform set does not have the acceptable probability of collision, calculating the first transform for the first part of the key;

o) calculating the second transform for a second part of the key;

p) calculating a third transform for the key; and q) forming a first-second-third combined transform by concatentating the first transform, the second transform and the third transform, wherein a first portion of the first-second-third combined transform is the address and a second portion of the first-second-third combined transform is the confirmer.

17. The method of claim 12, further including the steps of:

f) when the maximum key length is less than the length for the transform and the no collisions allowed condition exists, setting a transform length equal to at least the maximum key length;

g) determining a complete transform set;

h) selecting a portion of the complete transform set that is perfect to form a second transform set, wherein the second transform set is the hashing code.

18. The method of claim 12, further including the steps of:

f) when the no collisions allowed condition does not exist, determining if a reduced transform will provide an acceptable probability of collision;

g) when the reduced transform will provide an acceptable probability of collision, determining a complete transform set for the first linear feedback transform generator;

h) selecting a portion of the complete transform set that is perfect to form a second transform set, wherein the second transform set is the hashing code.

19. A method of forming a hashing code, comprising the steps of:

a) determining an allowed probability of collision;

b) determining a probability of collision over a first range of a transform;

c) when the probability of collision is less than the allowed probability of collision, determining a maximum number of keys;

d) determining an address length so that a number of addresses is not less than the maximum number of keys;

e) when the address length is less than the first range, determining if a reduced transform will provide an acceptable probability of collision;

f) when the reduced transform will provide an acceptable probability of collision, determining a complete transform set for a first linear feedback generator; and g) selecting a portion of the complete transform set that is perfect to form a second transform set, wherein the second transform set is the hashing code.

* * * * *